United States Patent
Bader

(10) Patent No.: US 11,577,577 B2
(45) Date of Patent: Feb. 14, 2023

(54) AIR CONDITIONING SYSTEM OF A VEHICLE SEAT HAVING COMFORT-OPTIMIZED OPERATION BY MEANS OF APPROPRIATE SWITCHING OF THE SEAT VENTILATION SYSTEM

(71) Applicant: VOLKSWAGEN AKTIENGESELLSCHAFT, Wolfsburg (DE)

(72) Inventor: Viktor Bader, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 441 days.

(21) Appl. No.: 16/880,554

(22) Filed: May 21, 2020

(65) Prior Publication Data
US 2020/0282798 A1   Sep. 10, 2020

Related U.S. Application Data

(63) Continuation of application No. PCT/EP2018/081871, filed on Nov. 20, 2018.

(30) Foreign Application Priority Data

Nov. 21, 2017  (DE) ...................... 10 2017 220 770.1

(51) Int. Cl.
*B60H 1/00* (2006.01)
*B60H 1/22* (2006.01)

(52) U.S. Cl.
CPC ..... *B60H 1/00285* (2013.01); *B60H 1/00785* (2013.01); *B60H 1/00821* (2013.01); *B60H 1/2218* (2013.01); *B60H 2001/003* (2013.01)

(58) Field of Classification Search
CPC .............. B60H 1/00285; B60H 1/0073; B60H 1/00735; B60H 1/00742; B60H 1/00785;
(Continued)

(56) References Cited

U.S. PATENT DOCUMENTS 5,921,314 A   7/1999 Schuller et al.
5,934,748 A * 8/1999 Faust .................. B60N 2/5635
                                                297/180.12
(Continued)

FOREIGN PATENT DOCUMENTS

CN   105059158 A   11/2015
CN   105857009 A    8/2016
(Continued)

OTHER PUBLICATIONS

WO-2018079041-A1 (Year: 2018).*
Chinese Office Action dated Dec. 30, 2021 in corresponding application 2018800738271.

*Primary Examiner* — Jenna M Hopkins
(74) *Attorney, Agent, or Firm* — Muncy, Geissler, Olds & Lowe, P.C.

(57) ABSTRACT

A method for air conditioning a vehicle seat that is occupied by a person and that comprises at least one seat ventilation system, wherein at least one humidity sensor is arranged in a seat part and/or a backrest part of the vehicle seat as an actual humidity value transmitter for the absolute air humidity within the cushion part of the at least one seat part and/or backrest part so that a target state of comfort for a person seated on the vehicle seat can be accomplished via a control and regulating device through engagement of the seat ventilation system, wherein the target state of comfort can be controlled to a specifiable target humidity limit value through variation of the air flow of the seat ventilation system as a function of at least one control algorithm that evaluates the detected actual measured humidity value.

12 Claims, 9 Drawing Sheets

(58) Field of Classification Search
CPC . B60H 1/2218; B60H 1/00821; B60H 1/3414
See application file for complete search history.

(56) References Cited

U.S. PATENT DOCUMENTS

| | | | |
|---|---|---|---|
| 6,019,420 A | 2/2000 | Faust et al. | |
| 6,892,807 B2* | 5/2005 | Fristedt | B60N 2/5692 |
| | | | 219/202 |
| 9,511,646 B2 | 12/2016 | Müller et al. | |
| 10,179,526 B2 | 1/2019 | Marquette et al. | |
| 10,759,256 B2 | 9/2020 | Bader et al. | |
| 2003/0039298 A1* | 2/2003 | Eriksson | G05D 27/02 |
| | | | 374/109 |
| 2007/0101729 A1* | 5/2007 | Aoki | B60N 2/5657 |
| | | | 62/3.61 |
| 2013/0232996 A1 | 9/2013 | Goenka et al. | |
| 2015/0239321 A1 | 8/2015 | Müller et al. | |
| 2016/0229257 A1 | 8/2016 | Yerke et al. | |
| 2017/0028886 A1* | 2/2017 | Zhang | B60N 2/5657 |
| 2017/0305313 A1 | 10/2017 | Marquette et al. | |
| 2017/0341549 A1 | 11/2017 | Da Costa et al. | |
| 2018/0361894 A1* | 12/2018 | Wolf | B60N 2/5657 |
| 2020/0282798 A1* | 9/2020 | Bader | B60N 2/5621 |
| 2021/0078471 A1* | 3/2021 | Fujita | B60N 2/58 |
| 2021/0162904 A1* | 6/2021 | Lee | B60N 2/5621 |
| 2022/0258562 A1* | 8/2022 | Miyanaka | B60N 2/002 |

FOREIGN PATENT DOCUMENTS

| | | | | |
|---|---|---|---|---|
| DE | 1654400 A1 | | 2/1971 | |
| DE | 3903303 A1 | | 8/1990 | |
| DE | 4112631 C1 | | 4/1992 | |
| DE | 19634370 A1 | | 3/1998 | |
| DE | 19804284 A1 | | 8/1999 | |
| DE | 10019370 A1 | | 10/2001 | |
| DE | 102006005343 A1 | | 8/2007 | |
| DE | 102007039422 B4 | | 5/2009 | |
| DE | 102008018566 A1 | | 10/2009 | |
| DE | 102013003673 A1 | | 3/2014 | |
| DE | 102014206613 A1 | | 10/2015 | |
| DE | 102014219408 A1 | | 4/2016 | |
| DE | 102016108732 A1 | | 11/2016 | |
| DE | 102017111908 A1 | | 11/2017 | |
| DE | 102016219203 A1 | * | 4/2018 | |
| DE | 102016219203 A1 | | 4/2018 | |
| DE | 102017005702 A1 | * | 12/2018 | B60N 2/565 |
| EP | 2910413 A1 | | 8/2015 | |
| GB | 2579547 A | * | 7/2020 | B60H 1/00357 |
| JP | 2006076398 A | | 3/2006 | |
| JP | 2018131094 A | * | 8/2018 | B60H 1/00 |
| KR | 2020000282 A | * | 1/2020 | B60N 2/5628 |
| WO | WO9625301 A1 | | 8/1996 | |
| WO | WO-2009024226 A2 | * | 2/2009 | B60N 2/5642 |
| WO | WO-2015033070 A1 | | 3/2015 | B60N 2/5621 |
| WO | WO-2017145630 A1 | * | 8/2017 | B60H 1/00285 |

* cited by examiner

AIR CONDITIONING SYSTEM OF A VEHICLE SEAT HAVING COMFORT-OPTIMIZED OPERATION BY MEANS OF APPROPRIATE SWITCHING OF THE SEAT VENTILATION SYSTEM

This nonprovisional application is a continuation of International Application No. PCT/EP2018/081871, which was filed on Nov. 20, 2018, and which claims priority to German Patent Application No. 10 2017 220 770.1, which was filed in Germany on Nov. 21, 2017, and which are both herein incorporated by reference.

BACKGROUND OF THE INVENTION

Field of the Invention

The present invention relates to an air conditioning system and to a method for air conditioning a vehicle seat that comprises at least one seat ventilation system, wherein at least one humidity sensor is arranged in a seat part and/or a backrest part of the vehicle seat as an actual humidity value transmitter for the absolute air humidity within the cushion part of the at least one seat part and/or backrest part.

Description of the Background Art

A variety of ventilation concepts exist today in so-called actively ventilated vehicle seats, in which an air flow circulating within the cushion of the seat is created by at least one fan.

In a ventilation concept that is known from DE 198 04 284 A1, which corresponds to U.S. Pat. No. 6,019,420, for example, fans are run in pressure mode. A part of the air flow in this design is also forced through the perforations of the seat cover toward the seated occupants in order to create a pleasant seat climate. In addition to these systems that blow out, in which the relevant fan creates an appropriate air flow in pressure mode, systems are also known that operate with suction, such as can be learned from the document DE 10 2006 005 343 A1, for example.

In addition, from the document DE 10 2007 039 422 B4 a seat ventilation system is known that has at least one fan that can be operated in both suction mode and pressure mode. The seat is operated in suction mode in a first phase of seat ventilation, and is operated in pressure mode in a second phase of seat ventilation, wherein the switchover time when the switchover takes place from the first phase to the second phase is based on empirical values, so that the method for operating the seat ventilation system is carried out by means of a time-dependent specification of the switchover time. In a disadvantageous manner, a current and individual state of comfort of an occupant seated on the vehicle seat is therefore not taken into account in this seat ventilation, which is considered the closest prior art.

It is known from the document DE 10 2014 206 613 A1 that only the simultaneous measurement of skin temperature and skin humidity directly on a human being brings about the possibility of judging the individual state of thermal comfort of a given person.

While it is indeed possible with the aid of a temperature measurement to recognize that the "too cold" state of the skin is present, it is not possible to differentiate between the "neutral" or "comfortable" state and the "too warm" state.

During a transition from "neutral" or "comfortable" to "too warm," the skin of a person's body attempts to achieve heat emission with the aid of moisture emission and evaporation of the moisture through the skin. The contact temperature of the skin measured at the skin surface remains approximately the same as a result of the described evaporation effect of the skin. Consequently, a different method must be found in order to recognize the states of comfort. This is the starting point for the invention described below, since no seat ventilation system is known from the prior art that takes the individual state of thermal comfort of a given person into account to an adequate degree.

SUMMARY OF THE INVENTION

It is therefore an object of the present invention to create a seat ventilation system, and a method for operating the seat ventilation system, that ventilates a cushion of a vehicle seat in a manner that takes into account an individual state of thermal comfort of a person seated on the cushion of the vehicle seat.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
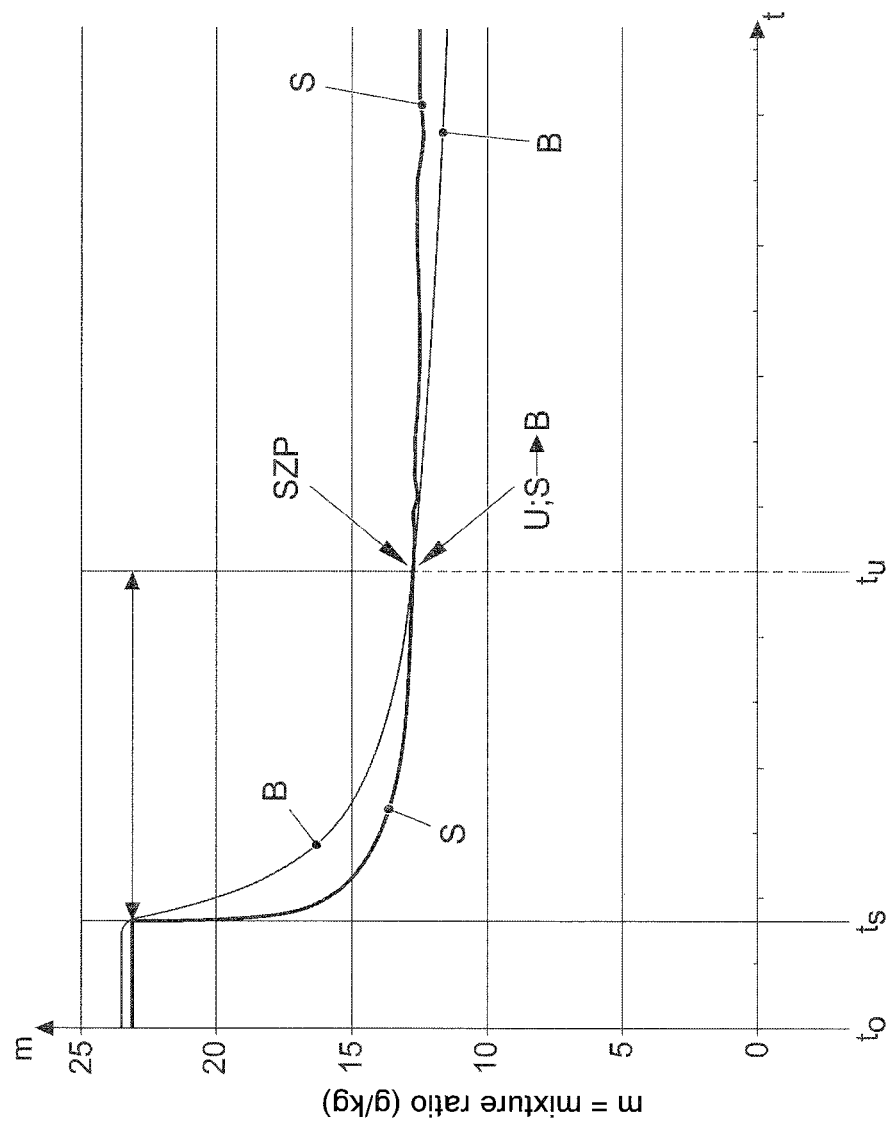
FIG. 1 shows a first diagram of the absolute humidity, in particular of a water vapor/air mixture ratio over time, to illustrate a saturation time at which essentially no more drying of a contact region occurs in a suction mode as compared to a blow mode.

The starting point of the invention is that the conventional seat ventilation systems and the methods for operating the seat ventilation systems in which the vehicle seats are operated exclusively in suction mode or in blow mode (=pressure mode) are less advantageous, as has already been explained in detail in the introduction.

The known possibility of being able to switch a seat ventilation system of a vehicle seat between suction mode and blow mode offers the advantages described in DE 10 2007 039 422 B4, wherein the known mode of operation is improved according to the invention to the effect that the seat ventilation system not only ensures a switchover between suction mode and blow mode that is time-dependent, but also permits a switchover that is need-based as a function of at least one comfort value measured in the contact region between the seated occupant and the vehicle seat, as described in detail below.

The contact temperature of the skin remains approximately the same in the transition of the cushion temperature in the states of comfort from "neutral" to "comfortable=pleasantly warm" to "too warm."

In order therefore to be able to recognize the states of comfort, in particular, it is proposed according to the invention to additionally measure the moisture emission of the skin of the seated occupant, since the measurement of the contact temperature of the skin does not suffice.

The basic idea includes that the determination of the skin temperature and of the skin humidity as comfort values that are measured in at least one contact region between skin and cushion opens up the possibility that the comfort values can be associated with specific states of comfort of the seated person.

By means of the comfort values, it is then possible according to the invention to carry out, in particular to control, the ventilation and/or the heating of the contact region or regions in a need-based manner for the cushion of the backrest and the cushion of the seat part independently of one another.

A "comfort-optimized mode of operation" of the seat ventilation system according to the invention with associated seat ventilation control and/or of the seat heater according to the invention with associated seat heating control, and the associated boundary conditions, are described in detail below.

As a boundary condition, it is known that an unpleasantly warm feeling of "too warm" arises above a "moisture limit" of the skin in at least one contact region (cushion/skin) of the seated occupant of approximately 13.5 g/kg of absolute humidity of the skin, which is also referred to as contact humidity, in particular in summer of approximately 12 g/kg absolute humidity and in winter of approximately 15 g/kg absolute humidity.

The seat ventilation control according to the invention prevents a specifiable moisture limit, in particular 15 g/kg of absolute humidity of the skin, from being exceeded as a function of the absolute humidity of the skin.

Provision is made in one variant embodiment that the seat ventilation system is gently activated in an anticipatory manner as soon as it is recognized that the current measured moisture value is tending toward the measured moisture value of the specifiable moisture limit, in particular toward a specifiable maximum "moisture limit" that must not be exceeded, in particular 15 g/kg.

For detection of the measured moisture value, the vehicle seat includes at least one humidity sensor, which is arranged in the cushion of the seat part and/or of the backrest.

Moreover, provision is made that a seat heater is activated in an anticipatory manner as soon as it is recognized in an anticipatory manner that a measured temperature value is tending toward a specifiable temperature limit, in particular toward a specifiable minimum temperature limit that must not be fallen below. Provision is made in this context that the contact temperature does not fall below a temperature limit value of 31° C., in particular.

For detection of the measured temperature value, the vehicle seat includes at least one temperature sensor or an integrated moisture/temperature sensor, which is arranged in the cushion of the seat part and/or of the backrest.

By means of in-house measurements in vehicle seats with integrated humidity and temperature sensors, it was found that, in addition to the exceedance of the moisture limit of, in particular, 15 g/kg, the temperature should not fall below the specifiable contact temperature of 31° C., in particular.

These stated measured values and limit values, in particular the measured humidity value, thus the moisture limit (contact humidity), and the measured temperature value, thus the temperature limit (contact temperature), are used within the seat ventilation comfort control in a vehicle seat.

It is a matter of course that the stated measured values depend on the position of the sensors in the relevant cushion part of the seat part or of the backrest, in particular on the distance of the sensors from the contact surface of the cushion parts.

The measured humidity value present in the contact region of the seated occupant with the cushion part and/or the measured temperature value present in the contact region is associated with the skin temperature of the seated occupant or the skin humidity of the seated occupant, wherein a corresponding correction value is taken into account that takes into account the occupant's clothing.

First, the volume flow rates $V_n$ were coordinated with one another to create multiple (n=1, 2, 3 . . . ) ventilation levels $SF_n$ in suction mode and in blow mode in order to ensure actual comparability between suction mode and blow mode.

For measuring the humidity and temperature in the at least one contact region of seat part and/or backrest, a heatable, fluid-emitting, unclothed seat dummy that represents the seated occupant, by means of which a homogeneous and full-area "sweating" can be simulated by specifying the emission of the fluid with the specification of a temperature of the seat dummy, was used to determine the measured moisture value and the measured temperature value.

It was found according to the invention that, as FIG. 1 shows, for drying of the relevant contact region, which is to say reduction of the absolute humidity between the cushion and the skin of the seated occupant, suction mode used initially in the cushions of the vehicle seat is more effective as compared with blow mode at the same air throughput.

The diagram in FIG. 1 shows a mixture ratio m over the time t of the air delivered or removed, wherein the mixture ratio m is the weight of the water vapor in g contained in 1 kg dry air.

From a starting time $t_s$, the drying in suction mode according to characteristic curve S (averaged characteristic curve of multiple suction characteristic curves of a humidity sensor in the cushion of a seat part and/or of a backrest) transitions, in particular at the time $t_u$, after a few minutes, into a type of saturation at a saturation time SZP, after which significant drying of the contact region no longer takes place.

The absolute humidity is defined by the water vapor mass contained in a specific volume of air. Also defined is the maximum air humidity, the maximum possible absolute air humidity at a specific temperature. This is achieved when the partial pressure of water vapor in the air is equal to the saturation pressure of water at the corresponding temperature. In this state, the relative air humidity is 100%. The relative air humidity is less than 100% when the air can still absorb water vapor.

It is also evident that the blow mode (characteristic curve B) further expedites the drying, in particular, of the at least one contact region of the relevant cushion of the vehicle seat after the time $t_u$, whereas the drying stagnates in suction mode, as is clear from FIG. 1 on the basis of the essentially horizontal shape of the characteristic curve S over time t to the right of the saturation time SZP.

This means that a switchover U; S→B from suction mode per characteristic curve S to blow mode at a switchover time $t_u$ per characteristic curve B (averaged characteristic curve of multiple blow characteristic curves of a humidity sensor in the cushion of a seat part and/or of a backrest), in particular at the saturation time SZP, thus demonstrably improves the drying action of the contact region of the seated occupant relative to the cushion.

Figure 2:
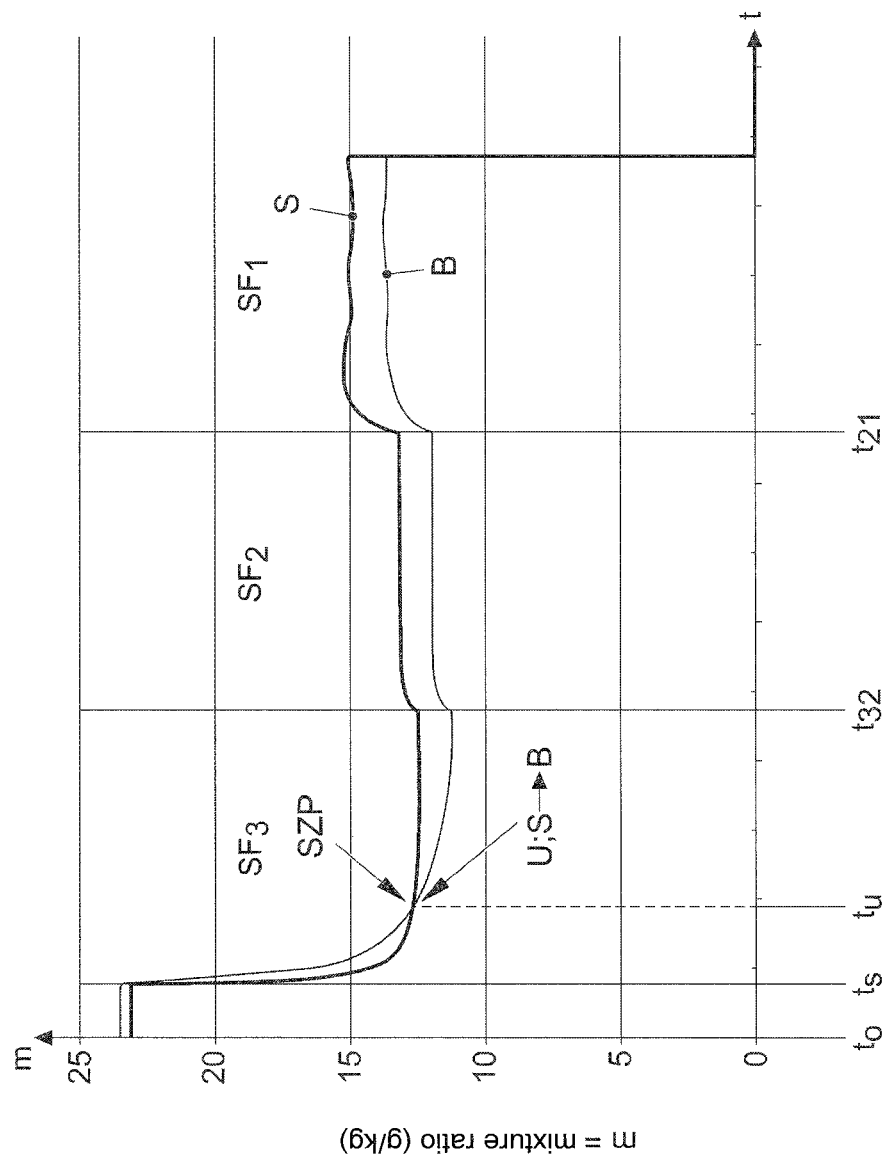
FIG. 2 shows a second diagram of the absolute humidity, in particular of the water vapor/air mixture ratio over time, to illustrate the ratios at different ventilation levels.

According to FIG. 2, therefore, the finding applies that a switchover U; S→B at the switchover time $t_u$ from suction mode per the averaged characteristic curve S to blow mode per the averaged characteristic curve B, in particular at the saturation time SZP, improves the drying action of the contact region over the course of time even when a reduction, in particular a stepwise reduction, of the volume flow rate $V_n$ is carried out in fan levels n=3.

In other words, the drying action is more effective in blow mode per the averaged characteristic curve B as compared to suction mode per the averaged characteristic curve S even when the volume flow rates $V_n(V_3>V_2>V_1)$ are reduced as illustrated in FIG. 2 on the basis of the ventilation levels $SF_3$, $SF_2$, $SF_1$ at the times $t_{32}$, $t_{21}$.

Figure 3:
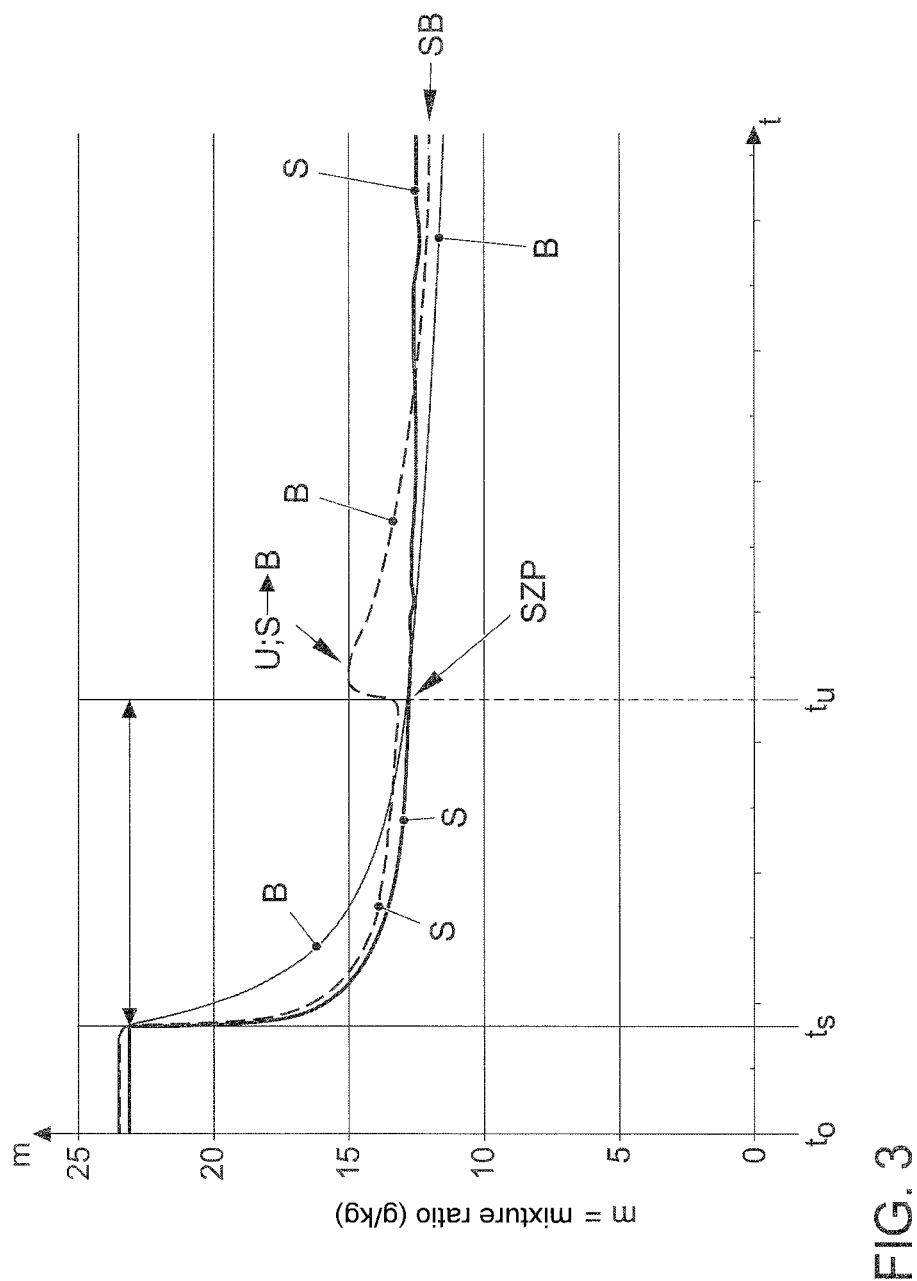
FIG. 3 shows a third diagram of the absolute humidity, in particular of the water vapor/air mixture ratio over time, to illustrate a transient rise in the absolute humidity after a switchover time from the suction mode into the blow mode.

It was also determined that a transient increase in the absolute humidity occurs in the contact region per the averaged characteristic curve SB from FIG. 3 at a switchover U; S→B at the switchover time $t_u$ from suction mode per characteristic curve S to blow mode per the averaged characteristic curve B, in particular at the saturation time SZP.

The cause of this is that moist air that has already been drawn in from a system of channels in the cushion of the vehicle seat, in particular from the cushion of the seat part and/or from the cushion of the backrest, is directed to the contact region of the seated person, as was established with the seat dummy and real persons.

Figure 4:
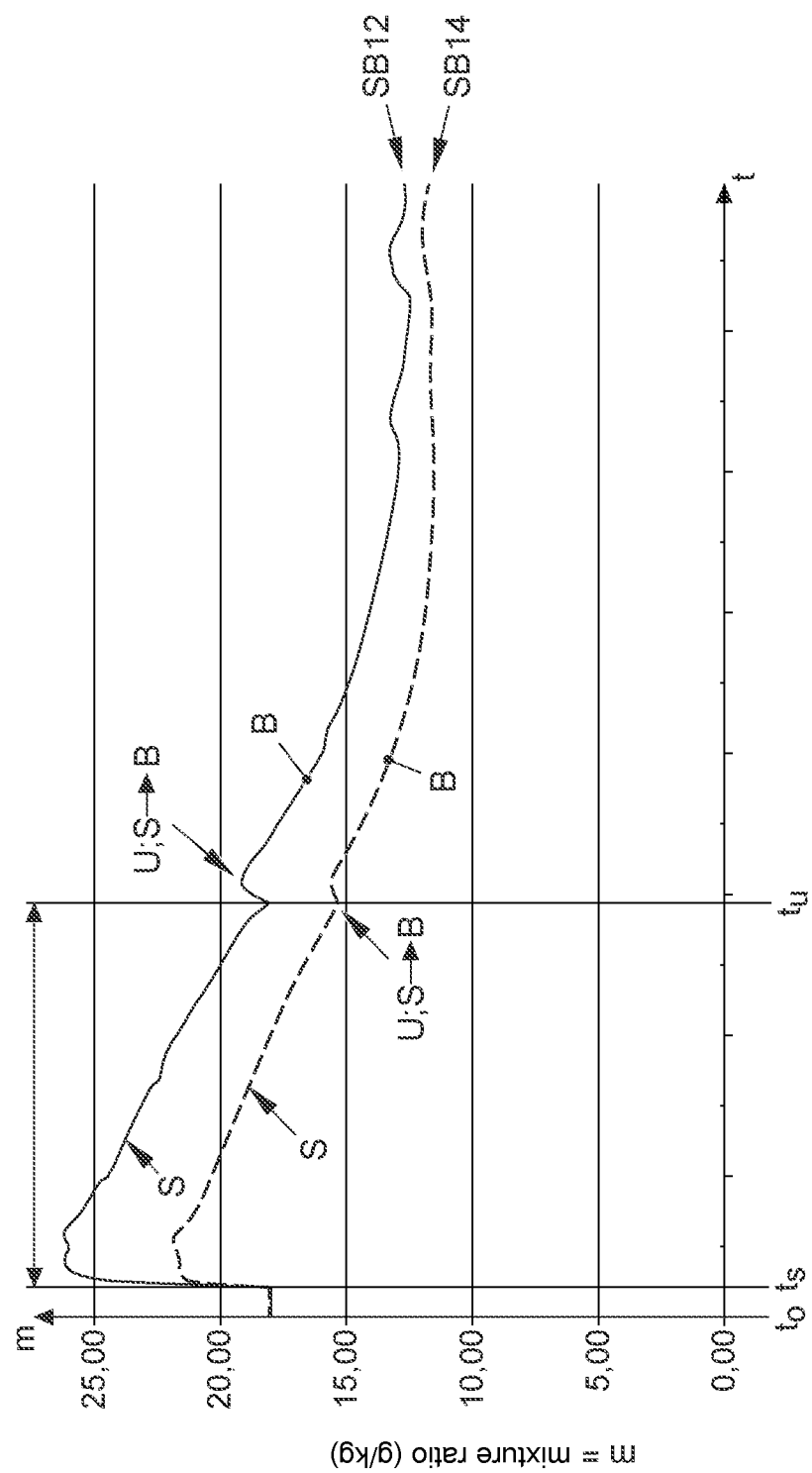
FIG. 4 shows a fourth diagram of the absolute humidity, in particular of the water vapor/air mixture ratio over time, to illustrate a transient rise in the absolute humidity after the switchover time from the suction mode into the blow mode for a seat part and a backrest.

According to FIG. 4, the transient rise in the absolute humidity after the switchover U; S→B from the suction mode S per the specific characteristic curve SB12, SB14 to the blow mode B is observable with the seat dummy and also with real persons, both in the cushion of the seat part and in the cushion of the backrest, as the characteristic curves SB12, SB14 illustrate specifically for the seat part and for the backrest.

The transient rise in the absolute humidity is perceived by real test subjects as unpleasant, in particular as "too damp" and/or in particular as "too warm."

It can thus be stated as an intermediate result that a switchover U; S→B from suction mode S per the averaged and specific characteristic curves SB12, SB14 to blow mode B per the averaged and specific characteristic curves SB12, SB14, in particular as early as in the saturation time SZP at the switchover time $t_u$, permits very rapid and more effective drying of the contact region, but the transient rise in the absolute humidity at the switchover U; S→B has an unfavorable effect on the well-being, and thus the comfort, of the seated occupant.

It is proposed according to the invention that a switchover U; S→B from suction mode S per the averaged and specific characteristic curves SB12, SB14 to blow mode B per the averaged and specific characteristic curves SB12, SB14, in particular in the saturation time SZP at the switchover time $t_u$, which may also be before the saturation time SZP, be carried out in such a manner that the transient rise in the absolute humidity is not perceived by the seated occupant.

It was discovered that a switchover U; S→B from suction mode into blow mode in the blow mode B per the averaged and specific characteristic curves SB12 or SB14 according to FIG. 4 is carried out at a latest switchover time $t_u$ to which a control variable is applied that includes that the transient rise in the moisture at the switchover U; S→B from suction mode into blow mode always remains below the specifiable moisture limit.

By detecting the measured moisture value in the at least one contact region in order to determine the latest switchover time $t_u$, it is ensured that the specifiable moisture limit in suction mode S, which is specified, for example, as mixture ratio m=15 g/kg, is always fallen below by the specifiable negative offset of at least Δm 0.5-2.0 g/kg, as measurements carried out for this purpose have shown.

The use of the negative offset has the effect that a latest switchover U; S→B from suction mode per the averaged and specific characteristic curves SB12, SB14 to blow mode B at a latest switchover time $t_u$ is always ensured by the specifiable negative offset, and that the seated occupant does not notice the transient rise in the absolute humidity after the switchover at the switchover time $t_u$, because the specifiable moisture limit, in particular the moisture limit of 15 g/kg stated by way of example, is not reached in blow mode B as a result of the specified negative offset.

In other words, the suction mode S takes place for long enough that the specifiable moisture limit is transited from above to below, so to speak, wherein provision is made that the suction mode is maintained until the specifiable negative offset of at least Δm 0.5-2.0 g/kg is reached and drying by the suction mode S is actually still ensured.

If no further drying effect in the at least one contact region is achieved by the suction mode S, see FIGS. 1 and 2, then the switchover U; S→B from suction mode per the characteristic curve SB12, SB14 to blow mode per the characteristic curve SB12, SB14 takes place.

The latest switchover time $t_u$ may coincide with the saturation time SZP or be before the saturation time SZP in this case. Since, as described, the drying effect in the contact region at the saturation time SZP in suction mode (again, see FIGS. 1 and 2) achieves only little additional effect, provision is made that the latest switchover time $t_u$ is close to the saturation time SZP.

It is a matter of course that the relevant negative offset value Δm depends upon the circumstances of the relevant vehicle seat from among different vehicle seats, on account of different lengths of the air channel system between fan(s) and ventilation openings as well as the fluid absorption capacities and/or fluid release capacities of the relevant cushion, and consequently is established by experiment separately for each vehicle seat type, for which reason the negative offset value is not a fixed quantity applying to all vehicle seats.

According to the invention, provision is additionally made to ensure fully automatic control of the sent ventilation, taking into account the seat heater control in accordance with the detected contact temperature in the contact region.

To prevent excessive cooling of the seated occupant, the measured temperature value is also continuously controlled in the same contact region in addition to the measured humidity value of the absolute humidity. Consequently, a measured humidity value and a measured temperature value are always present in the same contact region.

The relevant cushion part can have multiple contact regions, with a measured humidity value and a measured temperature value associated with each of them.

In this context, as explained above, the specifiable moisture limit is defined as a control variable for the fully automatic control as a control variable in suction mode S, wherein the control always attempts to ensure that the moisture limit is fallen below by the negative offset $\Delta m$.

In addition, as already explained above, the specifiable contact temperature is defined as a temperature limit for the fully automatic control as an additional control variable in suction mode S and blow mode B, so that the control always attempts to ensure that the temperature limit is not fallen below.

Preferably, the temperature of, in particular, 31° C. as the temperature limit value is defined as the temperature limit that is not to be fallen below, which is also considered and referred to as the so-called contact temperature for comfort.

Preferably, the absolute humidity of, in particular, m=15 g/kg as the moisture limit value is defined as the moisture limit that is not to be exceeded, which is also considered and referred to as the so-called contact humidity for comfort.

Proposed is a fully automatic control of the seat ventilation system, taking into account the fully automatic seat heater control in accordance with the detected contact temperature, wherein excessive cooling of the seated occupant is always prevented.

Accordingly, the contact humidity for comfort, thus the moisture limit value, and the contact temperature for comfort, thus the temperature limit value, are continuously monitored and controlled to this end, wherein the contact humidity for comfort is always held below the specifiable moisture limit, as explained, with the mixture ratio m=15 g/kg as the moisture limit value.

Figure 6:
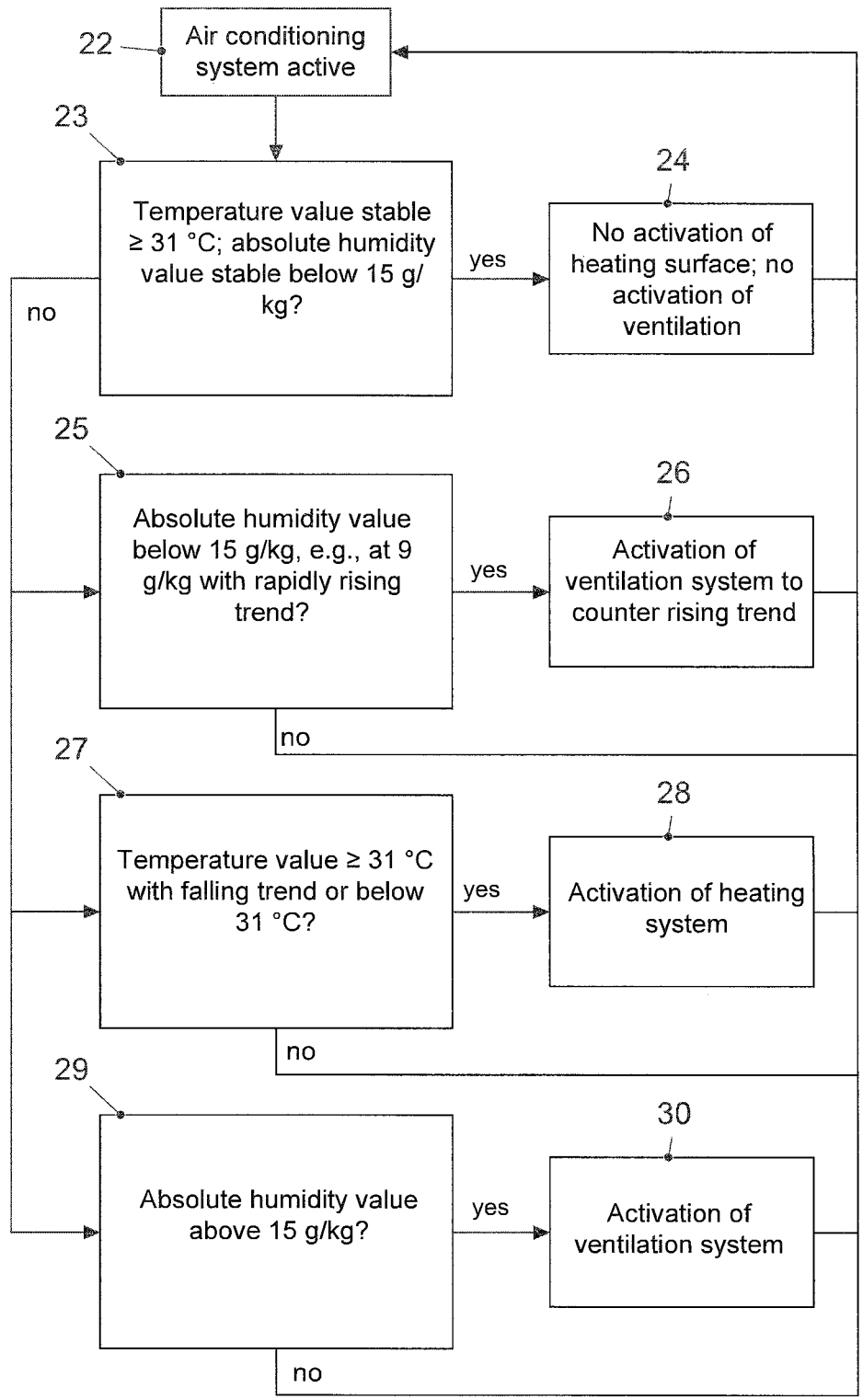
FIG. 6 shows a first flowchart for a control strategy.

Control strategy in a basic operating mode:

According to FIG. 6, control is carried out according to the invention using a control strategy that is specified in a flowchart.

According to the status box 22, the control of an air conditioning system comprising a seat ventilation system and a seat heater is active, and the functions can be changed (switched) to a switched-on or switched-off state in accordance with the decision boxes 23, 25, 27, 29. The seat part and/or the backrest are equipped accordingly with the seat ventilation system and a seat heater.

If, in accordance with a first decision box 23, a stable measured temperature value of greater than or equal to 31° C. is detected by means of the cushion temperature sensor in the relevant contact region, and a stable absolute measured humidity value below the absolute humidity limit value of 15 g/kg is detected by means of the cushion humidity sensor, then optimal conditions are present in the contact region(s), with the result according to status box 24 that no activation of a heating surface of the seat heater and no activation of the seat ventilation system takes place. This desirable state may already have been controlled in advance as the target state of comfort with the following control strategies.

In this case, if an absolute measured humidity value relatively far below 12 g/kg, for example 9 g/kg, having a rapidly rising trend is detected in accordance with a decision box 25 that follows the decision box 23, then according to a status box 26 the seat ventilation system is switched on with a control signal for control in opposition to this rising trend in order to prevent an overshoot by the measured humidity value above the humidity limit value of 15 g/kg, wherein a measured temperature value of approximately 31° C. is also maintained as the temperature limit value on the part of the controller.

In a decision box 27 that likewise follows the decision box 23, if a measured temperature value of greater than or equal to the temperature limit value of 31° C. or with a falling trend or a measured temperature value of below 31° C. is present, then according to a status box 28 the heating surface of the seat heater is engaged with a control signal to control the temperature to the temperature limit value of 31° C.

Additionally, in a decision box 29 that likewise follows the decision box 23, if an absolute measured humidity value above 15 g/kg as the moisture limit value is detected, then according to a status box 30 the seat ventilation system is engaged with a control signal to reduce the absolute humidity value below the moisture limit value of 15 g/kg.

Engaging of the seat ventilation system consequently occurs according to the status boxes 26 and 30, wherein the seat heating system is engaged as well if the described conditions are met.

The ventilation and heating of the cushion parts of the seat part and/or of the backrest of the vehicle seat thus take place by means of the seat ventilation system and the seat heater.

Controllable heating elements are arranged in the cushion parts of the vehicle seat. In other words, the seat part and/or the backrest has a seat heater or a seat heating system.

The ventilation system includes at least one fan, which conveys air through ventilation openings in the relevant cushion part by suction or by blowing from the passenger compartment of the vehicle through the relevant cushion part of the vehicle seat into the passenger compartment of the vehicle.

The relevant cushion part has at least one temperature sensor as actual temperature value transmitter for the temperature within the cushion part and at least one humidity sensor as actual humidity value transmitter for the absolute air humidity within the cushion part.

As a result, the thermal state conditions can be controlled for the at least one contact region of a cushion part using a control device with the heating system and/or with the ventilation system, using a control algorithm that evaluates the detected actual temperature values and actual humidity values, by varying the air flow and/or the heat output as target specification for a thermal state of comfort to a specifiable target measured temperature value, if applicable an adjustable target temperature limit range between 29° C. and 33° C., preferably 31° C., and to an absolute target measured humidity value between 12 g/kg and 15 g/kg, preferably below and less than an absolute target humidity limit value, if applicable a specifiable absolute target humidity limit value of 15 g/kg.

Figure 7:
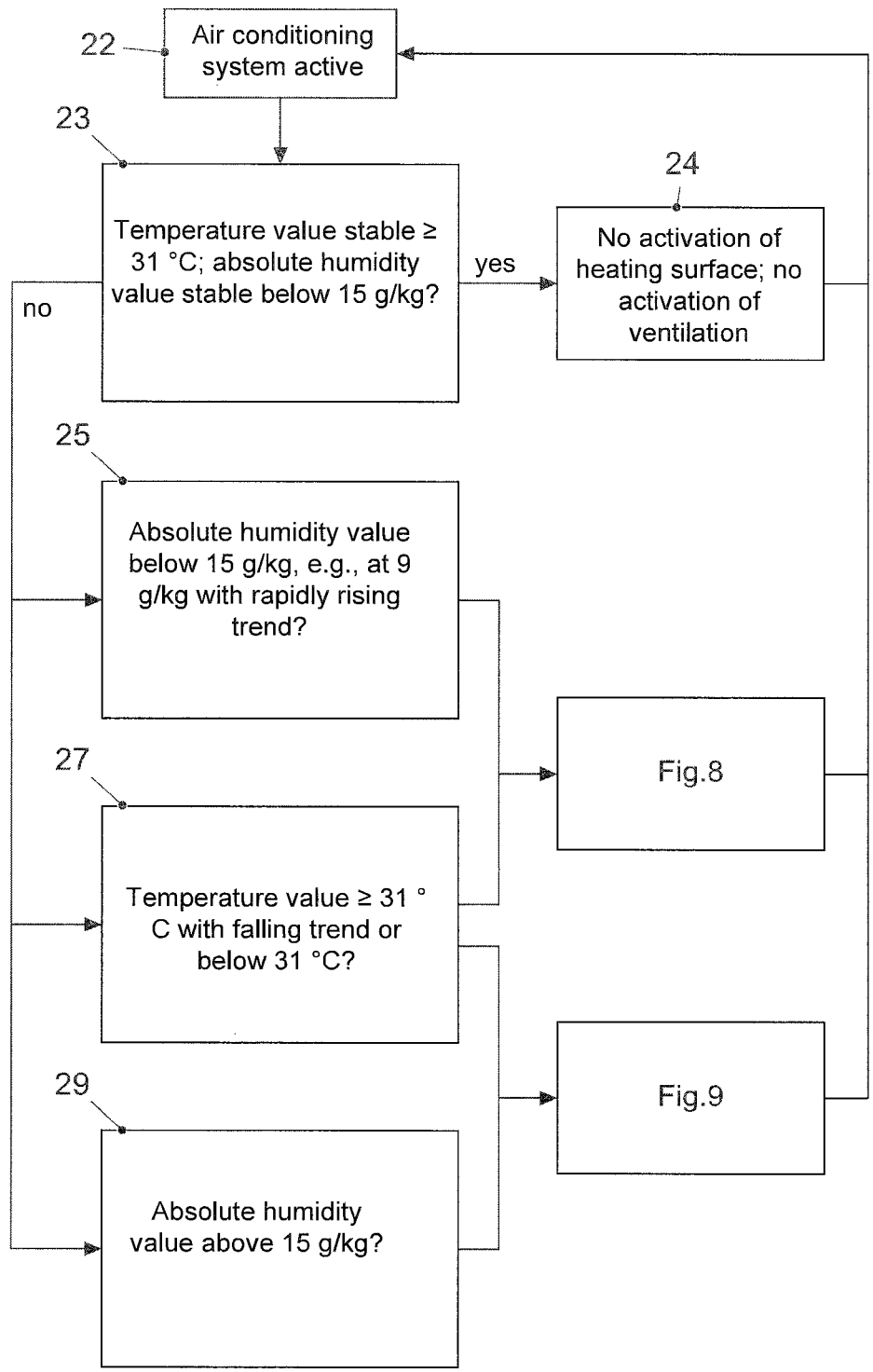
FIG. 7 shows a second flowchart for a decision strategy for suction and/or blow mode.
Figure 8:
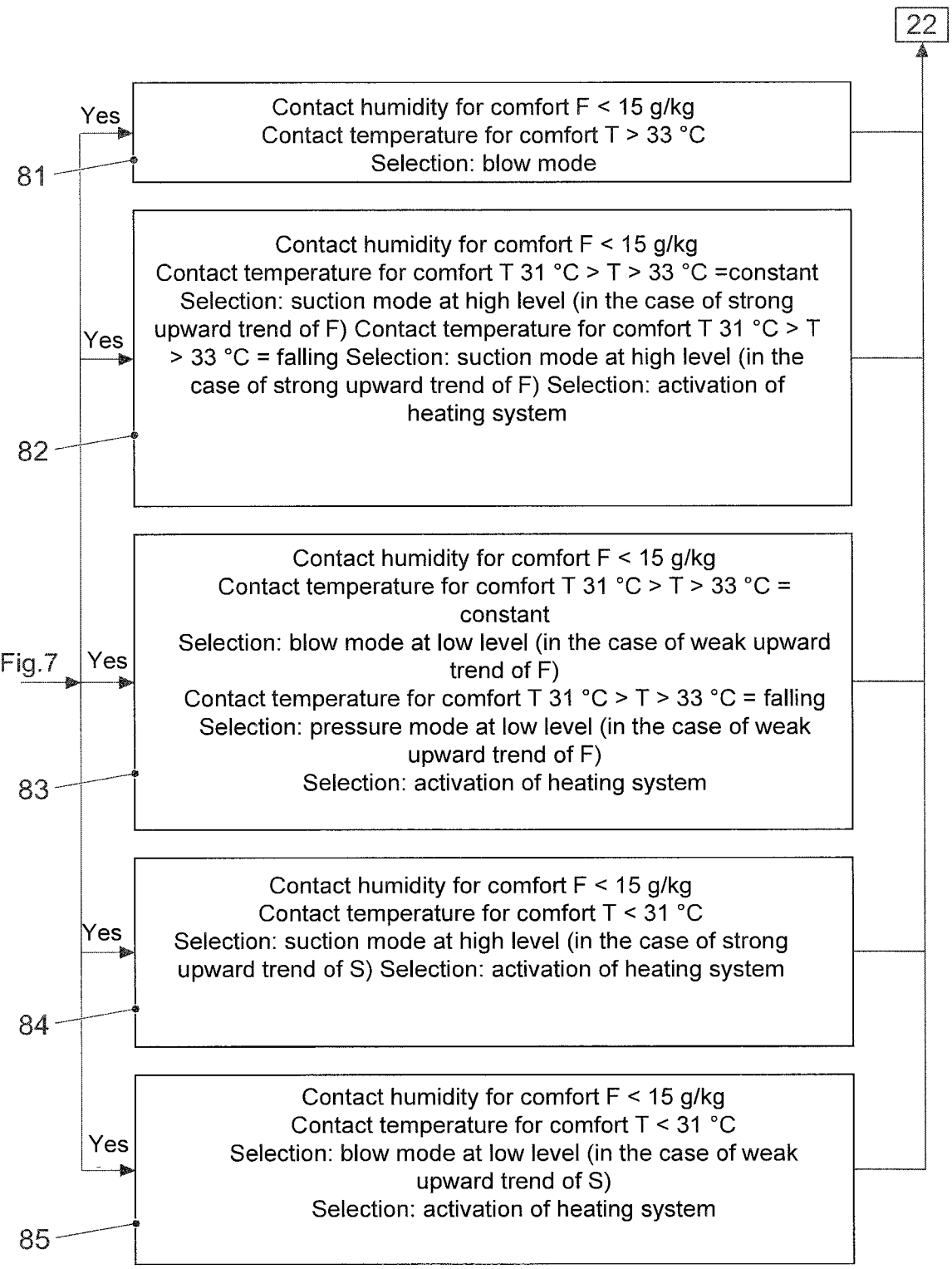
FIG. 8 shows a flowchart for the decision strategy for suction and/or blow mode from FIG. 7 as a function of a contact humidity for comfort below a moisture limit value and of a contact temperature for comfort.
Figure 9:
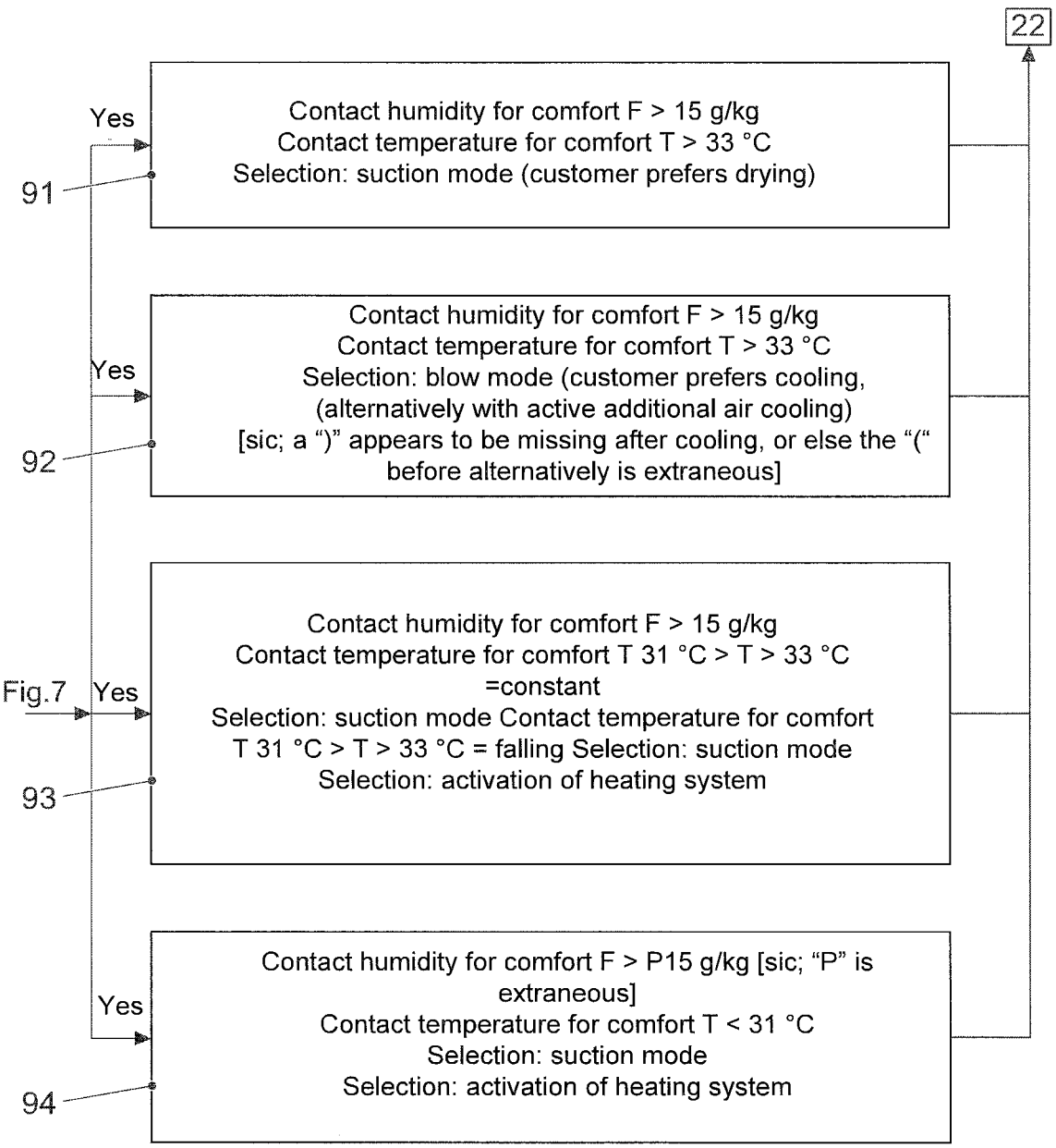
FIG. 9 shows a flowchart for the decision strategy for suction and/or blow mode from FIG. 7 as a function of a contact humidity for comfort above the moisture limit value and of the contact temperature for comfort.

Engaging of the seat ventilation system consequently occurs according to the decision boxes 26, 30, and if applicable engagement of the seat heating system takes place as well according to the decision box 28, wherein an "expanded comfort-optimized mode of operation," which is described on the basis of FIGS. 7, 8, and 9, is proposed in the automatic operation of the control in each case.

Control strategy in the expanded comfort-optimized mode of operation:

On the basis of a decision flowchart it is explained in FIG. 7 whether the suction mode S or the blow mode B should be engaged first when the seat ventilation system is activated.

The explanation uses the higher-level control strategy flowchart from FIG. 7, which is expanded relative to FIG. 6 (see FIG. 6) in that the status and selection boxes 81 to 85 and 91 to 94 shown in FIGS. 8 and 9 take into account the moisture limit value and the temperature limit value and a trend of humidity and temperature behavior as well as the activation of the seat ventilation system in suction mode S or blow mode B, as is explained below.

The following effects are taken into account in this process in order to improve the comfort of the seated occupant.

Figure 5:
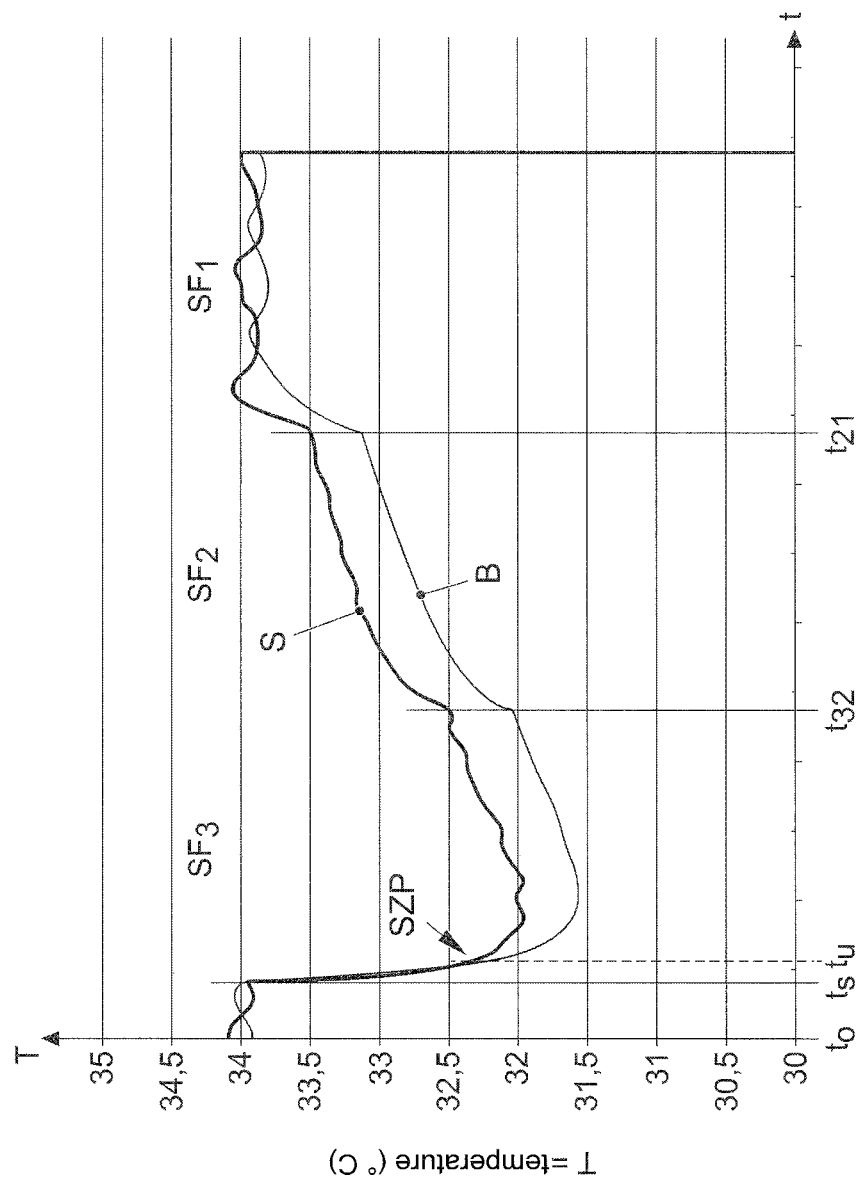
FIG. 5 shows a diagram of the temperature over time to illustrate a more effective cooling effect of the blow mode in comparison to a suction mode.

Drying in suction mode S more effective:

It is illustrated in FIGS. 1 to 3 that drying in the contact region is more effective in suction mode S (characteristic curve S) than in blow mode B up to the switchover time $t_u$, but it is illustrated in FIG. 5 that a cooling effect in the contact region in blow mode B (characteristic curve B) is stronger than in suction mode S due to the blowing out of air.

As a function of the stepwise reduction in the volume flow rate $V_n(V_3>V_2>V_1)$ according to the ventilation levels $SF_3$, $SF_2$, $SF_1$ (n=3) of the fan shown in FIG. 5, cooling is more effective in blow mode per the averaged characteristic curve B as compared with suction mode per the averaged characteristic curve S.

Spot effect and negative draft perception in suction mode S less than in blow mode B:

Another aspect of effects to be considered with respect to comfort in designing the seat ventilation system is that there is a higher risk of draft perception in blow mode B as compared with suction mode S, since a spot effect can be produced in the contact region of the seated occupant by the flow blowing out at the ventilation openings.

Spot effect and negative draft perception in blow mode B less at low volume flow rates:

Furthermore, according to the invention the effect occurs that, at the switchover U; S→B from suction mode S per the averaged and specific characteristic curves SB12, SB14 to blow mode per the averaged and specific characteristic curves SB12, SB14, such an undesirable spot effect is substantially reduced, because at high moisture values, in particular moisture limit value m>15 g/kg, at which a high fan power is used, the suction mode of operation is used, which causes less draft perception. In other words, an initial suction mode at high fan power that is advantageously followed by a blow mode at lower fan power reduces the risk of an undesirable spot effect in the contact region.

Below, the decision flowchart from FIG. 7 is explained in conjunction with FIGS. 8 and 9, wherein an expanded operating mode is determined automatically with the aid of the decision flowchart, which operating mode is chosen taking into account at least one of the following decision criteria a) through d).

The decision criteria are:
a) the deviation of the actual measured moisture value from the target moisture limit value (contact humidity for comfort), and
b) the deviation of the actual measured temperature value from the target temperature limit value (contact temperature for comfort), and
c) the trend of the humidity behavior, and
d) the trend of the temperature behavior.

As a function of the at least one decision n criterion a) to d), at least one selection decision e) to g) is made, in particular:

e) the engagement of the seat ventilation system in suction mode S or in blow mode B as a function of at least one of the criteria a) to d), and f) the switchover in switchover operation SB as a function of the selected suction mode S according to the criterion e), and g) the engagement of the seat heater as a function of the criteria b) and/or d).

According to the status box 22, the control of an air conditioning system comprising the seat ventilation system and the seat heating system is active in a manner analogous to FIG. 6, and the functions can be changed (switched) to an engaged or switched-off state in accordance with the decision boxes 23, 25, 27, 29. In accordance with the status box 22, again in a manner analogous to FIG. 6, the air conditioning system, and thus the seat ventilation system and the seat heating system, is active and the seated occupant sits on the vehicle seat so that at least one actual measured temperature value and at least one actual measured humidity value in the at least one contact region of the seat part and/or of the backrest can be determined. The seat part and/or the backrest are accordingly equipped with the seat ventilation system and the seat heating system.

If, in accordance with the first decision box 23 in FIG. 7, a stable measured temperature value of greater than or equal to >31° C. is detected by means of the cushion temperature sensor in the relevant contact region, and a stable absolute measured humidity value below the absolute humidity limit value of <15 g/kg is detected by means of the cushion humidity sensor, then optimal conditions are present in the contact region(s), with the result according to the status box 24, in a manner analogous to FIG. 6, that no activation of a heating surface of the seat heater and no activation of the seat ventilation system takes place. A "comfort-optimized mode of operation" is already present.

In FIG. 7, the decision boxes 25 and 27 and the decision boxes 27 and 29 are now connected together and, according to FIGS. 8 and 9, result in the "expanded comfort-optimized mode of operation," as explained below on the basis of FIGS. 8 and 9.

In FIG. 8, the status and selection boxes 81, 82, 83, 84, 85 are shown, which arise as a function of the decision criteria a) to d) at an actual humidity limit value <15 g/kg, which is to say that the target contact humidity for comfort F has not (yet) been reached.

According to the invention, the specification of a temperature limit range is provided. A specifiable maximum temperature $T_{max}$ is set for the contact region that is greater than the temperature for comfort of 31° C.; in the exemplary embodiment, this is 33° C., in particular.

The specifiable temperature limit range is thus $\Delta T=2K$ between 31° C. and 33° C.

If, in accordance with the status and selection box 81, an actual measured temperature value above the maximum temperature $T_{max}$ of the temperature limit value of 33° C. is detected by means of the cushion temperature sensor in the relevant contact region and if the actual measured moisture value that is detected by means of the cushion humidity sensor in the relevant contact region is less than the specifiable <15 g/kg moisture limit value, then no seat heating is required, and the seat ventilation system is set to the blow mode B (priority on cooling), as is illustrated on the basis of the status and selection box 81.

Since the actual measured moisture value is less than the definable <15 g/kg humidity limit value, a priority on the drying of the contact region can be relinquished in favor of cooling of the contact region, for which reason blow mode B (priority on cooling) is automatically selected and engaged.

As explained, in blow mode B (priority on cooling), there is a higher risk of the perception of drafts as compared with suction mode S (priority on drying), since a spot effect can arise in the contact region of the seated occupant due to the flow blowing out at the ventilation openings. However, it was determined that when the actual measured temperature value is above the maximum temperature $T_{max}$ of the temperature limit value of 33° C., unpleasant perception of drafts does not occur due to the high temperature T>33° C., which in particular is above the maximum temperature $T_{max}$ of 33° C., and thus can be disregarded.

If, in accordance with the status and selection boxes 82 and 83, an actual measured temperature value that is constant or falling in the temperature limit range is measured between 31° C. and 33° C. by means of the cushion temperature sensor in the relevant contact region, then in the case in which an actual measured humidity value of <15 g/kg of the target moisture limit value is detected by means of the humidity sensor in the relevant contact region, a decision is made as a function of the upward-rising trend of the humidity as to whether suction mode S (priority on drying) is selected according to the status and selection box 82, or blow mode B (priority on cooling) is selected according to the status and selection box 83.

In the case of a strong upward trend of the humidity value, suction mode S (priority on drying) with a high speed, which is to say with a high ventilation level $SF_n$; n=3 (see FIG. 2), is selected according to the status and selection box 82. Since the actual measured temperature value in one case is relatively constant and is constantly above the target temperature limit value of 31° C., the seat heating system is not needed and thus is not engaged.

In the case of a strong upward trend of the actual humidity value, suction mode S (priority on drying) with a high speed, which is to say with a high ventilation level $SF_n$; n=3 (see FIG. 2), is selected according to the status and selection box 82. Since the actual measured temperature value in another case is sharply falling and after a short time might possibly no longer be above the target temperature limit value of 31° C., the seat heating system is needed and thus is already engaged in parallel.

In the case of a weak upward trend of the actual humidity value, blow mode B (priority on cooling) at a lower speed, which is to say with a low ventilation level $SF_n$; n=2 or n=1 (see FIG. 2), is selected according to the status and selection box 83. Since the actual measured temperature value in one case is relatively constant and is constantly above the target temperature limit value of 31° C., the seat heating system is not needed and thus is not engaged.

In the case of a weak upward trend of the actual humidity value, blow mode B (priority on cooling) at a lower speed, which is to say with a low ventilation level $SF_n$; n=2 or n=1 (see FIG. 2), is selected according to the status and selection box 83. Since the actual measured temperature value in the other case is sharply falling and after a short time might possibly no longer be above the target temperature limit value of 31° C., the seat heater is needed and thus is already engaged.

It is evident that drying in the contact region no longer has priority in the case of a weak upward trend of the humidity value, so blow mode B (priority on cooling) is automatically selected.

If, in accordance with the status and selection boxes 84 and 85, an actual measured temperature value that is below the target temperature limit range of <31° C. is measured by means of the cushion temperature sensor in the relevant contact region, then in the case in which an actual measured humidity value of <15 g/kg of the moisture limit value is detected by means of the cushion humidity sensor in the relevant contact region, a decision is made as a function of the upward-rising trend of the humidity as to whether suction mode S (priority on drying) is selected according to the status and selection box 84, or blow mode B (priority on cooling) is selected according to the status and selection box 85.

In the case of a strong upward trend of the actual humidity value, suction mode S with a high speed, which is to say with a high ventilation level $SF_n$; n=3 (see FIG. 2), is selected according to the status and selection box 84. Since the actual measured temperature value is below the target temperature limit value of less than <31° C., the seat heater is needed and thus is engaged.

In the case of a weak upward trend of the actual humidity value, blow mode B (priority on cooling) at a lower speed, which is to say with a low ventilation level $SF_n$; n=2 or n=1 (see FIG. 2), is selected according to the status and selection box 85. Since the actual measured temperature value is below the target temperature limit value of less than <31° C., the seat heater is needed and thus is engaged.

In this temperature limit range, cooling, and thus blow mode (priority on cooling) of the contact region should have priority. However, blow mode B (priority on cooling) or cooling is only selected as the operating mode if the target temperature limit value of less than <31° C. is fallen below and the absolute humidity of the specifiable target humidity limit value of <15 g/kg is present.

In FIG. 9, the status and selection boxes 91, 92, 93, 94 are shown, which arise as a function of the decision criteria a) to d) for an actual humidity limit value >15 g/kg, which is to say that the target contact humidity for comfort F likewise has not (yet) been reached.

If, in accordance with the status and selection box 91, an actual measured temperature value above the maximum temperature $T_{max}$ of the temperature limit value of 33° C. is detected by means of the cushion temperature sensor in the relevant contact region, and if the specifiable actual measured moisture value that is detected by means of the cushion humidity sensor in the relevant contact region is greater than the specifiable moisture limit value of >15 g/kg, then no seat heating is required, and the seat ventilation system is now set to suction mode S (priority on drying), as is illustrated on the basis of the status and selection box 91. Since the actual measured moisture value is now greater than the specifiable target humidity limit value of >15 g/kg, the priority of drying of the contact region relative to cooling of the contact region can be maintained, for which reason the operating suction mode S (priority on drying) is automatically selected.

Alternatively, proceeding from the status and selection box 91, provision is made according to the status and selection box 92 for the occupant to individually prefer a blow mode B, if applicable.

In this context, it is noted that provision is made that the operating mode that the occupant himself has preset, the operating modes S or B automatically running due to the preset, can be overridden at any time by the occupant and the other operating mode can be selected using a selection element within the seat ventilation system.

At any point in time, therefore, the seated occupant can fundamentally choose between a maximally rapid drying (suction mode S) or a maximally rapid cooling (blow mode B) in the contact region. This exercise of influence by the occupant also applies to the automatic engagement of the seat heater in the applicable operating mode S or B preset by the user himself through a selection element within the seat heating system, with which the occupant can at any time individually prevent the automatic engagement of the seat heating system or switch the automatically engaged seat heating system off again.

Provision is made according to the invention that, when the occupant prefers a blow mode B and thus priority for cooling according to the status and selection box 92, he switches to the blow mode B, which in the case of high humidity >15 g/kg is without air cooling according to the invention in a first variant embodiment, or is combined with air cooling of the blown air in a second variant embodiment. The occupant can select these variant embodiments during the presetting or switch a preset selection of one or another variant embodiment by means of an additional selection element within the seat ventilation system.

If, in accordance with the status and selection box 93, an actual measured temperature value that is constant or falling in the temperature limit range is measured between 31° C. and 33° C. by means of the cushion temperature sensor in the relevant contact region, then in the case in which an actual measured humidity value of >15 g/kg of the target moisture limit value is detected by means of the humidity sensor in the relevant contact region, suction mode S (priority on drying) is always selected. Since the actual measured temperature value in one case is relatively constant and is constantly above the temperature limit value of 31° C., the seat heating system is not needed and thus is not engaged. Since the actual measured temperature value in the other case is sharply falling and after a short time might possibly no longer be above the target temperature limit value of 31° C., the seat heater is needed and thus is already engaged.

If, in accordance with the status and selection box 93, an actual measured temperature value in the target temperature limit range <31° C. is measured by means of the cushion temperature sensor in the relevant contact region, then in the case in which an actual measured humidity value of >15 g/kg of the target moisture limit value is detected by means of the humidity sensor in the relevant contact region, suction mode S (priority on drying) is likewise always selected. Since the actual measured temperature value in this case is already relatively constant below the target temperature limit value of 31° C., and is constant above the target temperature limit value of 31° C., the seat heater is needed in any case and is engaged correspondingly.

Provision is preferably made according to the invention that when the selection of the operating mode of the seat ventilation system provides for maximally rapid drying with the seat ventilation system in suction mode S, the switchover U; S→B according to the invention always takes place in accordance with the above description, by which means a further rapid drying of the contact region is achieved that is without negative effect on the perception of the seated occupant in accordance with the offset control according to the invention at the switchover time.

In summary, provision is made according to the invention that in the case of low actual measured moisture values, in particular in the case of a mixture ratio of m<15 g/kg, blow mode B (priority on cooling) is automatically used as the operating mode unless the humidity F already has a strong upward trend, as described according to the status and selection box 82. In the case of a strong upward trend of the humidity F, suction mode S (priority on drying) is preferably already selected.

In further summary, provision is made according to the invention that when high values (mixture ratio m of water vapor to dry air greater than m>15 g/kg of absolute humidity) are detected in the contact region >15 g/kg at the start of a trip, suction mode S with a switchover mode with the described inventive switchover U; S→B from suction mode S (priority on drying) to blow mode B (priority on cooling) is always selected initially as the operating mode.

In further summary, provision is made according to the invention that, due to monitoring of the temperature limit range, in particular between the specifiable temperature values 31° C. to 33° C. and even above the temperature limit range, no active seat heating is necessary unless the trend of the detected measured temperature value is sharply falling, as first shown and described in the status and selection boxes 82, 83, and 93.

In further summary, provision is made according to the invention that, due to monitoring of the temperature limit range, in particular when the upper limit value >33° C. of the temperature limit range is reached or exceeded, cooling by means of the blow mode (priority on cooling) is selected as the automatic operating mode B, as long as the actual measured humidity value is below the target moisture limit value <15 g/kg, since otherwise the drying of the contact region has priority, for which reason the operating mode suction mode S then is preferably selected automatically.

Additionally, provision is made to provide a precooling of the seat surface before a person enters the vehicle, since the cooling of the contact region in a blowing seat ventilation system is stronger. Provision is made that the vehicle detects that a person is approaching the vehicle. The detection takes place, for example, by means of a system for preconditioning such as is described in the applicant's document DE 10 2014 219 408 A1, the content of which is herewith included in this application.

For example, a target state of comfort, which can be the contact temperature for comfort, in particular 31° C., for example, is predefined. During the preconditioning of a target state of comfort, the criterion that a person sits on the vehicle seat is not checked for activation of the air conditioning system and thus of the seat ventilation system and of the seat heater.

For example, if a person intends to enter in 30 minutes, the priority of drying of the contact region is relinquished in favor of cooling of the contact region, for which reason the operating mode blow mode B (priority on cooling) is automatically selected. The seat ventilation system is or remains in blow mode B (priority on cooling) until the target contact temperature for comfort, in particular 31° C., is reached. In the case of a seat ventilation system, the blowing seat ventilation system is more effective for preconditioning, since the intake locations for the seat fans are mostly arranged in the lower regions of the passenger compartment of a vehicle, where air in the passenger compartment is cooler than in the upper regions of the passenger compartment, for which reason the operating mode blow mode B (priority on cooling) likewise is suitable.

Following entry of the occupant, fully automatic control of the seat ventilation and seat heater is engaged, since the occupant is now sitting on the vehicle seat so that the current actual measured humidity values and actual measured temperature values are present, so operation proceeds according to the explanations for the control flowchart from FIG. 6 or FIG. 7 in conjunction with FIGS. 8 and 9.

Lastly, provision is made that the individual optimal target contact temperature for comfort and target contact humidity for comfort can be adjusted in a personalized manner by the occupant. At least these stated values are stored in a personalized climate profile in an associated control and regulating device. In this way, the so-called comfort level for the controller can be individually tailored to be "warmer" or "cooler".

In a manner analogous thereto, the humidity limit range and the temperature limit range of the seat ventilation system and/or the seat heater are provided so as to be individually adjustable by the vehicle occupant, so these values can also be stored in a personalized climate profile.

Thus, the occupant can individually select the target humidity limit value, for example 15 g/kg, within a specified humidity limit range, for example between 12 g/kg and 17 g/kg.

Thus, the occupant can individually select the target temperature limit value, for example 31° C., within a specified temperature limit range, for example—not as described—between 29° C. and 33° C. or between 25° C. and 35° C., etc.

The occupant can also select the maximum temperature $T_{max}$ for the temperature limit range, for example. The contact temperature for comfort is, for example, not 31° C. as described, but rather 32° C. He can also individually select a different contact temperature for comfort and adjust the temperature limit range for the contact region, so that it is not between 31° C. and 33° C. as described, but instead is between 32° C. and 34° C. ($\Delta T=2K$) in accordance with a corresponding selection, for example.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for air conditioning a vehicle seat that is adapted to be occupied by a person and that comprises at least one seat ventilation system, the method comprising:
   arranging at least one humidity sensor in at least one seat part and/or backrest part of the vehicle seat as an actual humidity value transmitter for an absolute air humidity within a cushion part of the at least one seat part and/or backrest part so that a target state of comfort for a person seated on the vehicle seat is accomplished via the at least one seat ventilation system;
   controlling the target state of comfort to a specifiable target humidity limit value through variation of an air flow of the at least one seat ventilation system as a function of at least one control algorithm that evaluates the detected absolute humidity value; and
   detecting, via the at least one seat ventilation system and as a function of the at least one humidity sensor arranged in at least one contact region between a cushion surface and a skin surface of the person as the actual humidity value transmitter, the absolute humidity value as a contact humidity in the at least one contact region that deviates from the specifiable target humidity limit value, so that as a function of a control deviation, operation is started either in a suction mode or in a blow mode and is corrected to the specified target humidity limit value,
   wherein a switchover to the blow mode is carried out in the suction mode as a function of reaching a saturation time at which a maximum possible air humidity is reached.

2. The method according to claim 1, wherein the vehicle seat additionally comprises at least one seat heating system, wherein at least one temperature sensor is arranged in the at least one seat part and/or backrest part of the vehicle seat as an actual temperature value transmitter for a temperature within the cushion part of the at least one seat part and/or backrest part so that the target state of comfort for the person seated on the vehicle seat can be accomplished via the at least one seat heating system, wherein the target state of comfort is controlled to a specifiable target temperature limit value through variation of a heat output of the at least one seat heating system as a function of at least one control algorithm that evaluates the temperature within the cushion part, wherein, as a function of the at least one temperature sensor arranged in the at least one contact region between the cushion surface and the skin surface of the person as an actual temperature value transmitter, the at least one seat heating system detects the temperature within the cushion part as a contact temperature in the contact region that deviates from the specifiable target temperature limit value.

3. The method according to claim 2, wherein the specifiable target humidity limit value and the specifiable target temperature limit value in the at least one contact region can be set individually, wherein the target humidity limit value corresponds to a contact humidity for comfort, in particular 15 g/kg of the weight in g of the water vapor in 1 kg dry air, and the specifiable target temperature limit value corresponds to a contact temperature for comfort, in particular 31° C., in the contact region.

4. The method according to claim 3, wherein the specifiable target humidity limit value and the specifiable target temperature limit value within the control algorithm are limit values of individually settable humidity limit ranges and temperature limit ranges.

5. The method according to claim 1, wherein a control variable is applied in the control algorithm that ensures that the absolute humidity value always remains below the specifiable target moisture limit value, in particular below 15 g/kg, in the case of a transient rise in the absolute humidity value at the switchover U; S→B from the suction mode into the blow mode.

6. The method according to claim 4, wherein in the suction mode, a latest switchover time is determined in the control algorithm, as a function of reaching the saturation time through the detection of the absolute humidity value in the at least one contact region and through specification of a negative offset of, in particular, $\Delta m$ 0.5-2.0 with respect to the specifiable target humidity limit value, so that as a result of the specification of the negative offset below the specifiable target humidity limit value at the switchover time always prevents an exceedance of the specifiable target humidity limit value.

7. The method according to claim 2, wherein the at least one seat ventilation system and/or the at least one seat heating system is started through the control algorithm as a function of at least one decision criteria:
   a) a deviation of the absolute humidity value from the specifiable target humidity limit value (the contact humidity for comfort), b) a deviation of the temperature within the cushion part from the specifiable temperature limit value (the contact temperature for comfort), c) a trend of the humidity behavior, and/or d) a trend of the temperature behavior in the suction mode or in the blow mode.

8. The method according to claim 7, wherein, as a function of the at least one decision criterion a) to d), at least one selection decision e) to g) is made:

e) the engagement of the at least one seat ventilation system in the suction mode S or in the blow mode B as a function of at least one of the criteria a) to d), f) the switchover into switchover operation U; S→B as a function of the selected suction mode S according to the criterion e), and/or g) the engagement of the seat heater as a function of the criteria b) and/or d).

9. The method according to claim 2, wherein a preconditioning of the target state of comfort can be carried out within the control algorithm, wherein the person is not seated on the vehicle seat, so that the criterion that the person is located in the vicinity of the vehicle equipped according to the invention serves as a trigger for the activation of the air conditioning system and the engagement of the at least one seat ventilation system and/or of the at least one seat heating system.

10. An air conditioning system comprising:
at least one seat ventilation system;
at least one humidity sensor arranged in at least one seat part and/or backrest part of a vehicle seat as an actual humidity value transmitter for an absolute air humidity within a cushion part of the at least one seat part and/or backrest part,
wherein the at least one seat ventilation system provides a target state of comfort for a person seated on the vehicle seat;
wherein the at least one humidity sensor is arranged in at least one contact region between a cushion surface and a skin surface of the person,
wherein the at least one seat ventilation system is configured to control the target state of comfort to a specifiable target humidity limit value through variation of an air flow of the at least one seat ventilation system as a function of at least one control algorithm that evaluates the detected absolute humidity value; and
wherein the at least one seat ventilation system is configured to detect, as a function of the at least one humidity sensor arranged in the at least one contact region between the cushion surface and the skin surface of the person, the absolute humidity value as a contact humidity in the at least one contact region that deviates from the specifiable target humidity limit value, so that as a function of a control deviation, operation is started either in a suction mode or in a blow mode and is corrected to the specified target humidity limit value, and
wherein a switchover to the blow mode is carried out in the suction mode as a function of reaching a saturation time at which a maximum possible air humidity is reached.

11. The air conditioning system according to claim 10, further comprising at least one seat heating system, wherein at least one temperature sensor is additionally arranged in the at least one seat part and/or backrest part of the vehicle seat as an actual temperature value transmitter for detecting the temperature of the at least one contact region of the cushion part of the at least one seat part and/or backrest part so that the target state of comfort for the person seated on the vehicle seat can be accomplished via the at least one seat heating system, wherein the at least one seat heating system has at least one temperature sensor as the actual temperature value transmitter arranged in the at least one contact region between the cushion surface and the skin surface of the person.

12. An conditioning system comprising a non-transitory computer-readable medium having an algorithm stored thereon for carrying out the method according to claim 1.

* * * * *